United States Patent

Crabtree

[11] 3,992,381
[45] Nov. 16, 1976

[54] DIAZINE DYESTUFFS

[75] Inventor: Allen Crabtree, Manchester, England

[73] Assignee: Imperial Chemical Industries Limited, London, England

[22] Filed: May 2, 1975

[21] Appl. No.: 574,085

Related U.S. Application Data

[63] Continuation-in-part of Ser. No. 472,060, May 21, 1974, Pat. No. 3,951,974, which is a continuation-in-part of Ser. No. 323,359, Jan. 15, 1973, abandoned.

[30] Foreign Application Priority Data

Feb. 11, 1972 United Kingdom............ 6499/72
Aug. 28, 1973 United Kingdom............ 40522/73
Mar. 20, 1974 United Kingdom............ 12294/74

[52] U.S. Cl. .................. 260/256.5 R; 260/250 A; 260/250 P; 260/250 Q; 260/251 Q
[51] Int. Cl.² ..................................... G07D 239/24
[58] Field of Search .................. 260/256.5 R, 267

[56] References Cited
UNITED STATES PATENTS

| | | | |
|---|---|---|---|
| 1,886,809 | 11/1932 | Hess.................................. | 260/267 |
| 3,505,020 | 4/1970 | Caldwell........................ | 260/267 X |
| 3,776,691 | 12/1973 | Neeb et al. .................... | 260/266 X |

*Primary Examiner*—Leonard Schenkman
*Attorney, Agent, or Firm*—Cushman, Darby & Cushman

[57] ABSTRACT

Reactive azine dyestuffs of the formula:

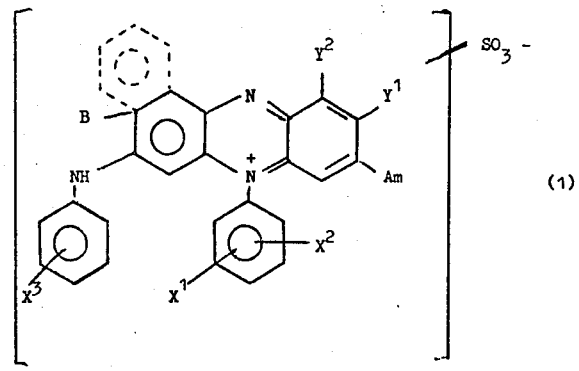

wherein Am is selected from a group consisting of anilino, di(lower alkyl)amino, di(hydroxyethyl)amino, di(cyanoethyl)amino and N(lower alkyl)benzylamino radicals; one of $Y^1$ and $Y^2$ is H or $SO_3H$ and the other is H or an alkyl or alkoxy group of 1-4 carbon atoms; one of $X^1$ or $X^2$ is H, $SO_3H$, and the other is H an alkyl or alkoxy group of 1-4 carbon atoms, Cl or $CO_2H$; $X^3$ is H, an alkyl group of 1-4 carbon atoms or $SO_3H$, when the dotted fused ring is present B is absent and when the dotted fused ring is absent B is H or an alkyl or alkoxy group of 1-4 carbon atoms; at least one of the pendant benzene nuclei contains a NHQ group where Q is a cellulose-reactive group of the diazine series and the dyestuff as a whole contains at least 2 sulphonic acid groups.

The products are reactive dyes for cellulose which are colored in strong bright blue or reddish-blue shades of excellent fastness to washing and of a reasonable fastness to light, especially in respect of wet fading.

4 Claims, No Drawings

DIAZINE DYESTUFFS

This application is a continuation in part of my copending application Ser. No. 472,060, filed 21st May, 1974 now U.S. 3,951,974 which is as a continuation in part of my application Ser. No. 323,359, filed 15th Jan., 1973, now abandoned.

This invention relates to new water-soluble reactive dyestuffs and more particularly to water-soluble reactive dyestuffs of the azine series.

According to the invention there are provided reactive azine dyestuffs of the formula:

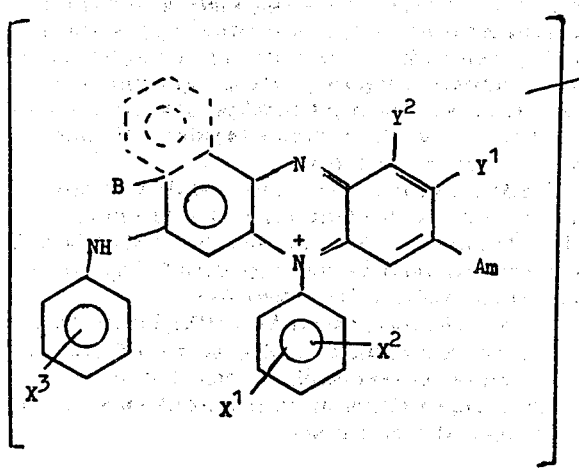

(1)

wherein Am represents an anilino, di(lower alkyl)amino, di(hydroxyethyl) amino, di(cyanoethyl)amino or N(lower alkyl)benzylamino group; one of $Y^1$ and $Y^2$ is H or $SO_3H$ and the other is H or an alkyl or alkoxy group of 1–4 carbon atoms; one of $X^1$ or $X^2$ is H, $SO_3H$, and the other is H, an alkyl or alkoxy group of 1–4 carbon atoms, Cl or $CO_2H$; $X^3$ is H, an alkyl group of 1–4 carbon atoms or $SO_3H$, when the dotted fused ring is present B is absent and when the dotted fused ring is absent B is H or an alkyl or alkoxy group of 1–4 carbon atoms; at least one of the pendant benzene nuclei contains a NHQ group where Q is a cellulose-reactive group of the diazine series and the dyestuff as a whole contains at least 2 sulphonic acid groups.

The sulphonic acid groups mentioned above may be provided by the groups $X^1$, $X^2$, $X^3$, $Y^1$ or $Y^2$ or alternatively or in addition by other sulphonic acid groups which may be present in the aromatic nuclei of the dyestuff. It is preferred that the dyestuff contains a total of 2 to 5 sulphonic acid groups.

By "cellulose-reactive group" is meant a group containing an unsaturated linkage or a substituent capable of reacting with the hydroxyl groups of the cellulose molecule in the presence of an alkaline substance and attaching the dyestuff molecule by a covalent linkage. The term "diazine series" refers to groups which are or contan a heterocyclic ring structure having two nitrogen atoms in the ring. It is generally preferred that this ring shall be six membered consisting of four carbon atoms and two nitrogen atoms.

As preferred examples of cellulose reactive groups of the diazine series there may be mentioned:

3:6-dichloropyridazine-4-carbonyl
2:3-dichloro-quinoxaline-5- and -6-carbonyl
2:3-dichloroquinoxaline-5- and -6-sulphonyl
2:4-dichloro-quinazoline-6- and -7-sulphonyl
2:4:6-trichloro-quinazoline-7- and -8-sulphonyl
2:4:7- and 2:4:8-trichloro-quinazoline-6-sulphonyl
2:4-dichloro-quinazoline-6-carbonyl
1:4-dichloro-phthalazin-6-carbonyl
β-(4:5-dichloro-pyridazonyl-1-)-propionyl  4-(4',5'-dichloro-pyridaz-6'-on-1'-yl)benzoyl
1-(4',5'-dichloro-pyridaz-6'-on-1'-yl)phenylsulphonyl and more particularly 1-pyrimidin-2-yl- or -4-yl radicals which contain on at least one of the remaining 2,4- and 6-positions, a bromine, a fluorine or a chlorine atom, a sulphonic acid group, a thiocyanato group, an aryloxy or arylthio group containing an electronegative substituent such as sulphophenoxy, sulphophenylthio, nitrosulphophenoxy, disulphophenoxy and sulphonaphthoxy, or a group of the formula:

(2)

wherein $Y^1$ represents a group of atoms necessary to form a 5- or 6-membered heterocyclic ring which may carry substituents or form part of a fused ring system; or a quaternary ammonium or pyridinium group; or a group of the formula:

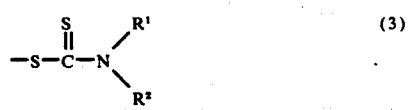

(3)

wherein $R^1$ and $R^2$ each represents the same or different alkyl, cycloalkyl, aryl or aralkyl groups, or $R^1$ and $R^2$ together form, together with the nitrogen atom, a 5- or 6-membered heterocyclic ring; or a group of the formula:

(4)

wherein $R^3$ and $R^4$ may be the same or different and each represents a hydrogen atom or an alkyl, aryl or aralkyl group.

In the cases where the pyrimidine ring carries only one such reactive substituent, the said ring may have a non-reactive substituent on the remaining carbon atoms.

By a non-reactive substituent there is meant a group which is bound by a covalent bond to a carbon atom of the pyrimidine nucleus, which covalent bond is not ruptured under the conditions used for application of the reactive dye.

As examples of such substituents, there may be mentioned, for example, primary amino and hydroxyl groups, also mono- or di-substituted aino groups, etherified hydroxyl and etherified mercapto groups; in the case of substituted amino groups, this class includes, for example, mono- and di-alkylamino groups in which the alkyl groups preferably contain at most 4 carbon atoms, and which may also contain substituents for example, hydroxyl or alkoxy groups, and phenylamino, preferably sulphonated phenylamino which may be further substituted on the nucleus, e.g. by $CH_3$, $OCH_3$, $CO_2H$ or Cl, or on the N atom, e.g. by $CH_3$, $C_2H_5$, hydroxyethyl or sulphomethyl, and naphthylamino groups preferably sulphonated naphthylamino containing up to 3 sulphonic acid substituents; in the case of etherified hydroxyl and mercapto groups, this class includes, for example, alkoxy and alkylthio groups, this class includes, for example, alkoxy and alkylthio groups preferably those of low molecular weight, i.e. having up to 4 carbon atoms and phenoxy, phenylthio, naphthoxy or naphthylthio groups; as particular examples of all these classes there may be mentioned, for example, methylamino, ethylamino, dimethylamino, β-hydroxyethylamino, di(β-hydroxyethyl)amino, β-chloroethylamino, cyclohexylamino, anilino, o-, m- and p-sulphoanilino, 2,4-, 2,5- and 3,5-disulphoanilino, N-methylsulphoanilino, N-β-hydroxyethylsulphoanilino, mono-, di- and tri-sulphonaphthylamino, 4- and 5-sulpho-o-tolylamino, o-, m- and p-carboxyanilino, 4- and 5-sulpho-2-carboxyanilino, N-ω-sulphomethylanilino, methoxy, ethoxy, and butoxy, phenoxy, p-sulphophenoxy, o-chlorophenoxy and phenylthio groups. Chlorine atoms or cyano, nitro, carboxy and carbalkoxy groups in the 5-position of a pyrimidyl radical come into the category of non-reactive substituents.

As examples of particularly preferred reactive groups being or containing pyrimidinyl structures there may be mentioned:

2:4-dichloro-pyrimidin-6-yl
2:4-dibromo-pyrimidin-6-yl
4:6-dichloro-pyrimidin-2-yl
4:6-dibromo-pyrimidin-2-yl
2:4:5-trichloropyrimidin-6-yl
4:5:6-trichloropyrimidin-2-yl
5-methyl-2:4-dichloropyrimidin-6-yl
5-methyl-4:6-dichloropyrimidin-6-yl
5-nitro-2:4-dichloropyrimidin-6-yl
5-nitro-4:6-dichloropyrimidin-2-yl
2-chloro-5-nitro-6-methyl-pyrimidin-4-yl
4-chloro-5-nitro-6-methyl-pyrimidin-2-yl
2-chloro-5-nitropyrimidin-4-yl
4-chloro-5-nitropyrimidin-2-yl
2:4-dichloro-5-cyanopyrimidin-6-yl
4:6-dichloro-5-cyanopyrimidin-2-yl
5-ethoxycarbonyl-2-chloro-pyrimidin-4-yl
5-ethoxycarbonyl-4-chloro-pyrimidin-2-yl
2:4-dichloropyrimidin-5-carbonyl
5-chloro-2-methylsulphonyl-6-methylpyrimidin-4-yl
2,4-difluoro-5-chloropyrimidin-6-yl
4,6-difluoro-5-chloropyrimidin-2-yl The invention also provides a process for manufacture of the new dyestuffs which comprises reacting a phenazine compound of formula (1) wherein Am, B, $Y^1$, $Y^2$, $X^1$, $X^2$ and $X^3$ have the meaning stated above and at least one of the pendent benzene nuclei contains a $NH_2$ group with a compound of the diazine series which contains a halogen atom and at least one cellulose-reactive substituent attached to carbon atoms of the diazine ring, the reactants together containing at least 2 sulphonic acid groups.

The above process can conveniently be carried out by stirring the reactants in an aqueous medium, optionally in the presence of a water-soluble organic solvent, at a temperature within the range 0–100° C and preferably maintained at a pH of from 5–8.

As examples of compounds of the diazine series which may be used, there may be mentioned for example diazine compounds which contain 2 or more halogen, especially chlorine atoms in the ortho positions to the nitrogen atoms, such as 2:3-dichloro-quinoxaline-6- and -6-carbonyl chlorides,
2:3-dichloroquinoxaline-5- and -6-sulphonyl chlorides,
2:4-dichloro-quinazoline-6- and -7-sulphonyl chlorides,
2:4:6-trichloro-quinazoline-7- and -8-sulphonyl chlorides,
2:4:7- and 2:4:8-trichloro-quinazoline-6-sulphonyl chlorides,
2:4-dichloro-quinazoline-6-carbonyl chloride,
1:4-dichloro-phthalazin-6-carbonyl chloride,
2:4-dichloro-pyrimidine-5-carbonyl chloride,
β-(4:5-dichloro-pyridazonyl-1-)propionyl chloride,
1-(4'-chlorocarbonylphenyl)-4:5-dichloro-6-pyridazone,
14'-chlorosulphonylphenyl-4:5-dichloro-6-pyridazone,
2:4:6-tribromo- and trichloro-pyrimidines,
2:4:5:6-tetrachloropyrimidine,
5-methyl-2:4:6-trichloropyrimidine,
5-nitro-2:4:6-trichloropyrimidine,
2:4-dichloro-5-nitro-6-methyl-pyrimidine,
2:4-dichloro-5-nitropyrimidine,
2:4:6-trichloro-5-cyanopyrimidine,
5-ethoxycarbonyl-2:4-dichloro-pyrimidine,
2:4-dichloropyrimidine-5-carbonyl chloride,
4,5-dichloro-2-methylsulphonyl-6-methylpyrimidine,
2,4,6-trifluoro-5-chloropyrimidine,
3:6-dichloropyridazine-4-carbonyl chloride.

The phenazine compounds of formula (1) used in the above process are in some cases known and in others new. They are of various types which can be obtained by appropriate methods.

a. Compounds may contain the fused ring shown dotted in formula (1) as in formula (9) and wherein the group Am bears an amino group.

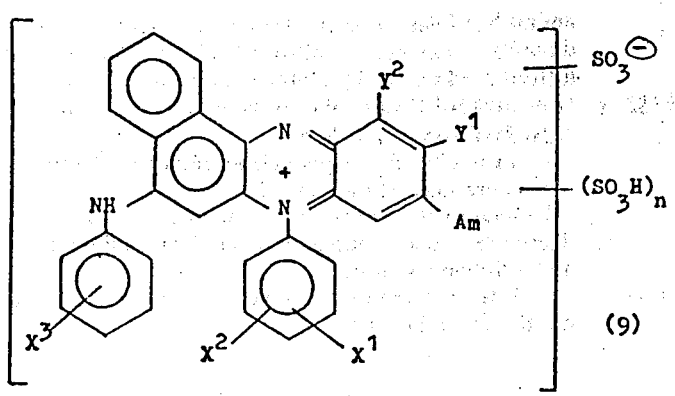

(9)

Such compounds may be prepared by reacting optionally sulphonated 1,3-dianilinonaphthalene compounds of the formula (10).

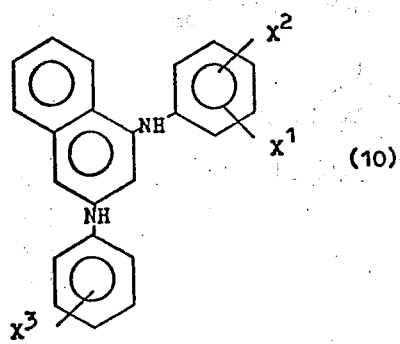

With, optionally sulphonated, amines of formula (11), where the group Am bears an NH group e.g. in 4,4'-diaminodiphenylamines Where Am, $Y^1$, $Y^2$ and $X^3$ have the meaning stated above and one of $X^1$ or $X^2$ is H or $SO_3H$ and the other is H alkyl or alkoxy of 1–4 carbon atoms, Cl or $CO_2H$ and n has a value of at least 1.

As examples of the optionally sulphonated amines (10) there may be mentioned.

1,3-dianilinonaphthalene-8-sulphonic acid, 1,3-dianilinonaphthalene 6,8-disulphonic acid, 1,3-di(4'-methylphenylamino)naphthalene-8-sulphonic acid 1,3-di(4'-methoxyphenylamino)naphthalene-8-sulphonic acid and 1,3-di(4'-ethylphenylamino)naphthalene-8-sulphonic acid.

As examples of the optionally sulphonated amines (11) there may be mentioned.

4,4'-diaminodiphenylamine-2'-sulphonic acid, 4,4'-diamino-2-methyldiphenylamine-2'-sulphonic acid, 4,4' diamino-3-methyldiphenylamine-2'-sulphonic acid, 4,4' diamino-2-methoxydiphenylamine-2'-sulphonic acid and 4,4'-diamino-3-methoxydiphenylamine-2-sulphonic acid.

b. Another group of amino phenazine compounds has the formula (12)

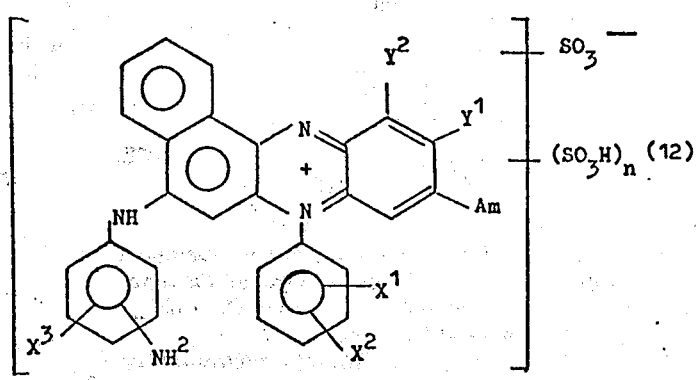

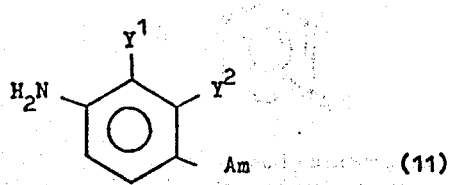

Such compounds may be prepared by reacting optionally sulphonated β-phenyl naphthylamines of formula (13)

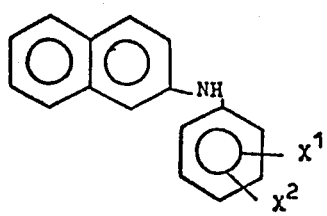

(13)

with a p-nitroso or p-aminobenzene compound of formula (14)

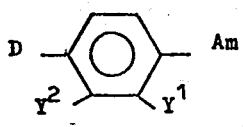

(14)

Where D is —NO or —$NH_2$ the resulting intermediate product is treated with an alkali metal bisulphite to introduce a sulphonic acid group and finally reacted with a phenylene diamine of formula (15).

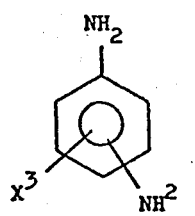

(15)

the symbols Am, $Y^1$, $Y^2$ and $X^3$ have the meaning stated above and one of $X^1$ or $X^2$ is H or $SO_3H$ and the other is H, alkyl or alkoxy of 1–4 carbon atoms, Cl or $CO_2H$ and N has a value of at least one.

As examples of the β-phenylnaphthylamines of formula (13) there may be mentioned.

phenyl-β-naphthylamine, 3'-methylphenyl-β-naphthylamine 4'-sulphophenyl-β-naphthylamine,3'-methoxyphanel-β-naphthylamine 4', methylphenyl-β-naphthylamine and 3' sulphophenyl-β-naphthylamine.

As examples of the compounds of formula (14) there may be mentioned.

4-amino-N,N,-dimethyl aniline, 4-amino-N,N-diethyl aniline 4-amino-N-ethyl-N-(3'-sulphobenzyl)aniline, 4-amino-N-methyl-N-(3'-sulphobenzyl)aniline, 4-amino-N,N(β-hydroxyethyl)aniline, 4-nitroso-N,N,-dimethyl aniline, 4-nitroso-N,N-diethylaniline 4-nitroso-N-ethyl-N-)3'-sulphobenzyl)aniline, 4 nitroso-N-methyl-N-(3'-sulphobenzyl)aniline and 4-nitroso-N,N(βhydroxyethyl)ailine As examples of the phenylene diamines of formula (15) there may be mentioned 1,4-diaminobenzene-2,5-disulphonic acid, 1,4-diaminobenzene-2-sulphonic acid, 2,5-diaminotoluene and 2,5-diaminoanisidine.

c. A further group of amino phenazine compounds has the formula (16).

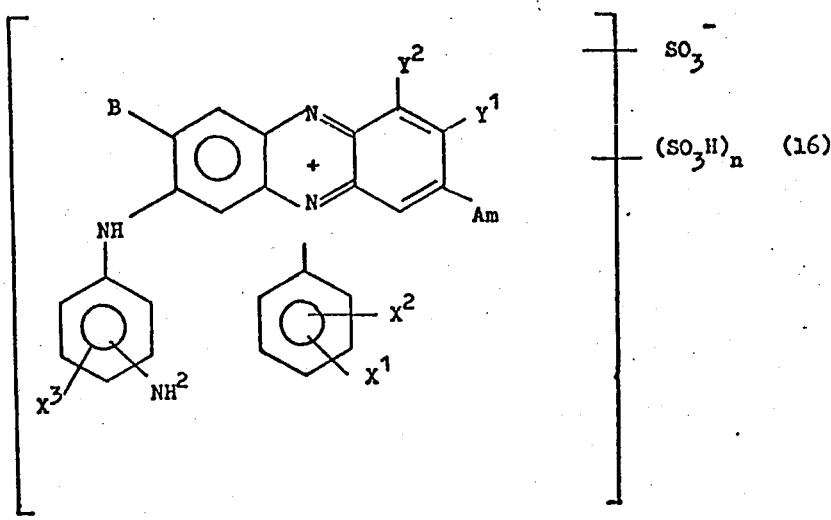

and may be prepared by condensing optionally sulphonated, nitro amino diphenylamine compounds of the formula (17).

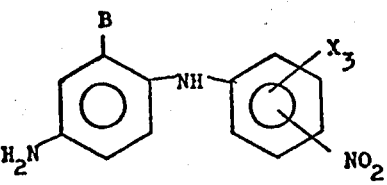

(17)

with an optionally sulphonated amine of the formula (18).

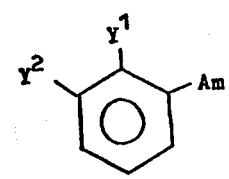

(18)

and an optionally sulphonated, amine of formula (19)

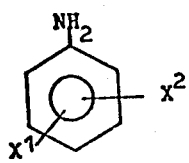

(19)

in the presence of an oxidising agent and reducing the product, the symbols Am, B, $Y^1$, $Y^2$ and $X^3$ have the meanings stated above, one of $X^1$ or $X^2$ is H or $SO_3H$ and the other is H, alkyl or alkoxy of 1–4 carbon atoms, Cl or $CO_2H$ and n has a value of at least one.

As examples of compounds of formula (17) which may be used there may be mentioned:

4-nitro-4'-aminodiphenylamine-2-sulphonic acid,
4-nitro-4'-amino-3'-methyldiphenylamine-2-sulphonic acid,
4-nitro-4'-amino-3'-ethyldiphenylamine-2-sulphonic acid, and
4-nitro-4'-amino-3'-methoxydiphenylamine-2-sulphonic acid.

As examples of compounds of formula (18) which may be used, there may be mentioned:

N-ethyl-N-(3'-sulphobenzyl)aniline,
N-methyl-N-(3'-sulphobenzyl)aniline,
N-n-propyl-N-(3'-sulphobenzyl)aniline, dimethyl- and diethyl-anilines,
di-(B-hydroxyethyl)aniline,
di-(B-cyanoethyl)aniline,
N-methyl- and N-ethyl-N-benzylanilines,
dibenzylaniline.

As examples of compounds of formula (19) which may be used, there may be mentioned:
4-chloroaniline-3-sulphonic acid,
4-methylaniline-3-sulphonic acid,
4-methoxyaniline-3-sulphonic acid,
3-methylaniline-4-sulphonic acid,
3-methoxyaniline-4-sulphonic acid,
aniline-4-sulphonic acid.

The dyestuffs of the present invention may be used for colouring a wide range of textile materials containing hydroxyl or amino groups, e.g. wool, silk, synthetic polyamides and natural or regenerated cellulose, for example, coton or viscose rayon materials, by the conventional methods used for colouring such materials with water-soluble reactive dyes, e.g. in the case of cellulose they are preferably applied in conjunction with a treatment with an acid-binding agent, e.g. caustic soda, sodium carbonate, phosphate, silicate or bicarbonate, which may be applied to the cellulose textile materials before, during or after the application of the dyestuff. The method, technique and conditions used for applying the dyestuff to the textile material will be selected according to various factors, e.g. the nature of the fibre or fibres present and the physical form of the textile material, for example, methods will vary depending on whether the fibre is loose or spun into thread which in turn may be in hanks or wound on bobbins or converted in cloth or garments by knitting or weaving. Any of the usual methods of dyeing or printing may be employed to apply the dye to the textile material and other dyestuffs and/or pigments may be also applied simultaneously or sequentially with the dyestuffs of the present invention using such combinations of conditions as are dictated by the properties of the dyestuffs and/or pigments. Such mixed dyeings are particularly valuable if the textile containing H or $NH_2$ groups is blended with other textile fibres free from such groups e.g. polyesters. The dyeing may be carried out in a batchwise manner using, for example exhaustion techniques in a beck, winch, jet, paddle or jig device, in particular for hanks, woven or knitted fabrics or garments; or it may be applied by a "package" dyeing technique to fibres wound in cakes or on cones, bobbins or warp beams, especially when these supports are perforated, or to loose fibres enclosed in permeable containers such as cages, pressure and/or vacuum may be employed to facilitate penetration and circulation through the packages. Alternatively continuous or semi-continuous dyeing methods may be employed, such as those employing padding techniques e.g. by padding mangles whereby the textile material is impregnated with dye liquor and then passed through rollers to control the amount of liquor retained, followed by one or more of a variety of post treatments e.g. drying, jig or winch development, baking, steaming, repadding in further solutions such as acid binding agents as mentioned above, storage in a moist condition at ambient or elevated temperatures, passing over heated rollers or passing through batchwise or continuous washing procedures. These post treatments may also incorporate finishing stages at which for example, antistatic or crease resistance agents can be incorporated. Textiles in sheet form may also be coloured by textile printing methods such as printing with engraved or embossed rollers or through screens or by transfer techniques such as wet transfer printing. Details of these and other suitable printing methods are described in "The Principles and Practise of Textile Printing" by E. Knecht, J. B. Fothergill and G. Hurst 4th Edition 1952 Published by Griffin or in "An Introduction to Textile Printing" by W. Clark 4th Edition 1974 Published by Newnes Butterworth.

Materials coloured by the new dyestuffs of the present invention have bright blue and reddish-blue shades of excellent fastness to washing.

Blue reactive dyes commercially available are generally based either on the anthraquinone chromophore or on a coppered azo chromophore. The present dyes exhibit an advantage over the former in providing a much higher colour strength on a molar basis, and against the latter in having much better fastness to wet fading.

The invention is illustrated by the following Examples in which parts are by weight and the ratio w/v is grams/litre.

EXAMPLE 1

A mixture of 18.8 parts of 1,3-diphenylaminonaphthalene-6,8-disulphonic acid, 11.4 parts of 4,4'-diaminodiphenylamine-2-sulphonic acid, and 9.5 parts of sodium carbonate is stirred in a mixture of 100 parts of water and 100 parts of ethyl alcohol. A solution of 1.5 parts of cupric sulphate pentahydrate in 10 parts of water and 15 parts of ammonia solution (S.G. = 0.890) is then added. A slow stream of air is bubbled through the mixture stirred at 35°–40° C for 24 hours.

The mixture was diluted with 200 parts of water and screened. The filtrates were cooled to 20° C, 100 parts of sodium chloride added and the precipitated phenazine of probable formula:

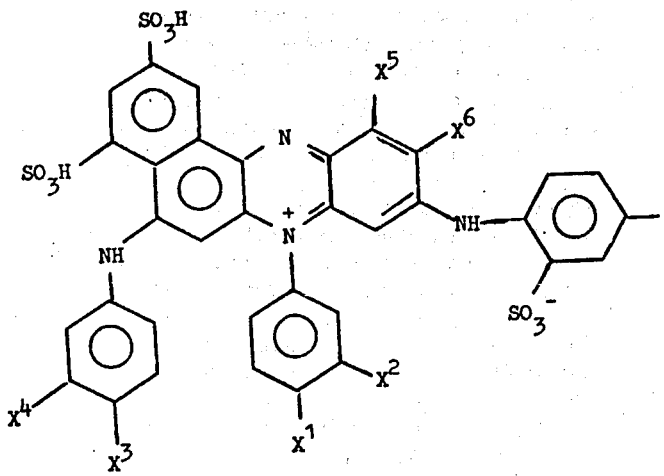

(5)

in which $X^1$, $X^2$, $X^3$, $X^4$, $X^5$ and $X^6$ = H, is filtered off, washed with saturated brine and dried.

A neutral solution of 7.43 parts of the aminophenazine in 250 parts of water is stirred at 45°–50° C and a solution of 2.2 parts of 5-cyano-2,4,6-trichloropyrimidine in 20 parts of dioxan is added dropwise during 15 minutes. The mixture is stirred at 40°–50° C for 4 hours maintaining a pH at 6–7 by addition of 2N sodium carbonate as required. The solution is cooled to 20° C and the dye precipitated by addition of sodium chloride, filtered and dried.

When applied to cotton or viscose textile materials in the presence of an acid binding agent the dye gives bright blue shades with good fastness to washing and moderate fastness to light.

Further examples of the invention are found in Table I where one equivalent of the compound defined in column II in which the symbols $X^1$, $X^2$, $X^3$, $X^4$, $X^5$ and $X^6$ refer to formula (5), is reacted with one equivalent of the acylating agent in column III. The shade on cotton of all the dyes is bright blue.

TABLE I

| I | II | | | | | | III |
|---|---|---|---|---|---|---|---|
| Example | $X^1$ | $X^2$ | $X^3$ | $X^4$ | $X^5$ | $X^6$ | |
| 2 | CH₃ | H | CH₃ | H | OCH₃ | H | 5-cyano-2,4,6-trichloropyrimidine |
| 3 | C₂H₅ | H | C₂H₅ | H | OC₂H₅ | H | " |
| 4 | OCH₃ | H | OCH₃ | H | C₂H₅ | H | " |
| 5 | OC₂H₅ | H | OC₂H₅ | H | CH₃ | H | " |
| 6 | H | OC₂H₅ | H | OC₂H₅ | H | CH₃ | " |
| 7 | H | OCH₃ | H | OCH₃ | H | C₂H₅ | " |
| 8 | H | C₂H₅ | H | C₂H₅ | H | OCH₃ | " |
| 9 | H | CH₃ | H | CH₃ | H | OC₂H₅ | " |

EXAMPLES 10–18

In place of the 5-cyano-2,4,6-trichloropyrimidine used in Examples 1–9 there may be used an equivalent amount of 2,4,6-trichloropyrimidine.

EXAMPLES 19–27

In place of the 5-cyano-2,4,6-trichloropyrimidine used in Examples 1–9 there may be used an equivalent amount of 2,4,5,6-tetrachloropyrimidine.

EXAMPLES 28–36

In place of the 5-cyano-2,4,6-trichloropyrimidine used in Examples 1–9 there may be used an equivalent amount of 2,4,6-tribromo pyrimidine.

EXAMPLES 37–45

In place of the 5-cyano-2,4,6-trichloropyrimidine used in Examples 1–9 there may be used an equivalent amount of 5-methyl-2,4,6-trichloropyrimidine.

EXAMPLES 46–54

In place of the 5-cyano-2,4,6-trichloropyrimidine used in Examples 1–9 there may be used an equivalent amount of 5-nitro-2,4,6-trichloropyrimidine.

EXAMPLES 55–63

In place of the 5-cyano-2,4,6-trichloropyrimidine used in Examples 1–9 there may be used an equivalent amount of 2,4-dichloro-5-nitro-6-methylpyrimidine.

EXAMPLES 64–72

In place of the 5-cyano-2,4,6-trichloropyrimidine used in Examples 1–9 there may be used an equivalent amount of 2,4-dichloro-5-nitropyrimidine.

EXAMPLES 73–81

In place of the 5-cyano-2,4,6-trichloropyrimidine used in Examples 1–9 there may be used an equivalent amount of 5-ethoxycarbonyl-2,4-dichloropyrimidine.

EXAMPLES 82–90

In place of the 5-cyao-2,4,6-trichloropyrimidine used in Examples 1–9 there may be used an equivalent amount of 2,4-dichloropyrimidine-5-carbonyl chloride.

EXAMPLES 91–99

In place of the 5-cyano-2,4,6-trichloropyrimidine used in Examples 1–9 there may be used an equivalent amount of 2,4,6-trifluoro-5-chloropyrimidine.

EXAMPLES 100–108

In place of the 5-cyano-2,4,6-trichloropyrimidine used in Examples 1–9 there may be used an equivalent amount of 4,5-dichloro-2-methylsulphonyl-6-methylpyrimidine.

EXAMPLES 109–117

In place of the 5-cyano-2,4,6-trichloropyrimidine used in Examples 1–9 there may be used an equivalent amount of 2,3-dichloroquinoxaline-5-carbonyl chloride.

EXAMPLES 118–126

In place of the 5-cyano-2,4,6-trichloropyrimidine used in Examples 1–9 there may be used an equivalent amount of 2,3-dichloroquinoxaline-6-carbonyl chloride.

EXAMPLES 127–135

In place of the 5-cyano-2,4,6-trichloropyrimidine used in Examples 1–9 there may be used an equivalent amount of 2,3-dichloroquinoxaline-5-sulphonyl chloride.

EXAMPLES 136–144

In place of the 5-cyano-2,4,6-trichloropyrimidine used in Examples 1–9 there may be used an equivalent amount of 2,3-dichloroquinoxaline-6-sulphonyl chloride.

EXAMPLES 145–153

In place of the 5-cyano-2,4,6-trichloropyrimidine used in Examples 1–9 there may be used an equivalent amount of 2,4-dichloroquinazoline-6-sulphonyl chloride.

EXAMPLES 154–162

In place of the 5-cyano-2,4,6-trichloropyrimidine used in Examples 1–9 there may be used an equivalent amount of 2,4-dichloroquinazoline-7-sulphonyl chloride.

EXAMPLES 163–171

In place of the 5-cyano-2,4,6-trichloropyrimidine used in Examples 1–9 there may be used an equivalent amount of 2,4,6-trichloroquinazoline-7-sulphonyl chloride.

EXAMPLES 172–180

In place of the 5-cyano-2,4,6-trichloropyrimidine used in Examples 1–9 there may be used an equivalent amount of 2,4,6-trichloroquinazoline-8-sulphonyl chloride.

EXAMPLES 181–189

In place of the 5-cyano-2,4,6-trichloropyrimidine used in Examples 1–9 there may be used an equivalent amount of 2,4,7-trichloroquinazoline-6-sulphonyl chloride.

EXAMPLES 190–198

In place of the 5-cyano-2,4,6-trichloropyrimidine used in Examples 1–9 there may be used an equivalent amount of 2,4,8-trichloroquinazoline-6-sulphonyl chloride.

EXAMPLES 199–207

In place of the 5-cyano-2,4,6-trichloropyrimidine used in Examples 1–9 there may be used an equivalent amount of 2,4-dichloroquinazoline-6-carbonyl chloride.

EXAMPLES 208–216

In place of the 5-cyano-2,4,6-trichloropyrimidine used in Examples 1–9 there may be used an equivalent amount of 1,4-dichlorophthalazine-6-carbonyl chloride.

EXAMPLES 217–225

In place of the 5-cyano-2,4,6-trichloropyrimidine used in Examples 1–9 there may be used an equivalent amount of β-(4,5-dichloropyridazin-1-)propionyl chloride.

EXAMPLES 226–234

In place of the 5-cyano-2,4,6-trichloropyrimidine used in Examples 1–9 there may be used an equivalent amount of 1-(4'-chlorocarbonylphenyl)-4,5-dichloro-6-pyridazone.

EXAMPLES 235–243

In place of the 5-cyano-2,4,6-trichloropyrimidine used in Examples 1–9 there may be used an equivalent amount of 1-(4'-chlorosulphonylphenyl)-4,5-dichloro-6-pyridazone

EXAMPLES 244–252

In place of the 5-cyano-2,4,6-trichloropyrimidine used in Examples 1–9 there may be used an equivalent amount of 3,6-dichloropyridazine-4-carbonyl chloride.

EXAMPLE 253

A mixture of 27.5 parts of 4-amino-4-nitrodiphenylamine-2'-sulphonic acid and 29.1 parts of N-ethyl-N-3'-sulphobenzylaniline is stirred in 750 parts of water at pH 6–7 and 0° C. A solution of 37.8 parts of sodium dichromate dihydrate in 200 parts of water and 18.6 parts of sulphuric acid at 0° C is added rapidly and the mixture stirred for 15 minutes. A solution of 15.5 parts of 4-aminobenzene sulphonic acid in 150 parts of water at 10° C and pH 6–7 is added. The mixture is then stirred at 15° C for 15 minutes, heated to 40° C, and stirred for a further 15 minutes and then heated rapidly to 80° C and 5.5 parts of sodium carbonate added After stirring at 80° C for 20 minutes the mixture is cooled to 65°–70° C, 25 parts of pin dust added and the mixture stirred at 70°–75° C for 75 minutes.

The mixture is filtered at 70° C and the residue extracted with 1500 parts of water at 70° C and refiltered The combined filtrates are salted 20% weight/volume with sodium chloride and allowed to cool. The precipitated aminophenazine of probable formula:

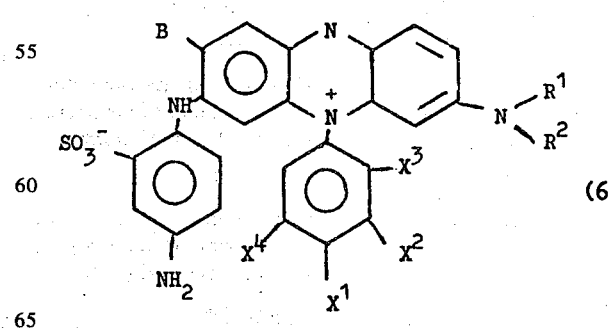

(6 wherein $X^1 = SO_3H$; $X^2$, $X^3$, $X^4$, B = H; $R^1 = C_2H_5$; $R^2$ = m-sulphobenzyl is filtered off, washed with 20 brine, and dried at 40° C.

A solution of 7.4 parts of the aminophenazine (6) in 200 parts of water is stirred at 40° C and pH 6–7. A solution of 2.2 parts of 5-cyano-2,4,6-trichloropyrimidine in 20 parts of dioxan is added dropwise during 15 minutes. The mixture is stirred at 40°–50° C for 4 hours maintaining the pH at 6–7 by addition of 2N sodium carbonate solution as required. The solution is cooled to 20° C and the dye precipitated by addition of sodium chloride, filtered and dried.

When applied to cotton or viscose textile materials in the presence of an acid binding agent it gives bright reddish blue shades of good fastness to washing and moderate fastness to light.

Further examples of the invention are found in Table II where one equivalent of the compound defined by column II in which the symbols $X^1$, $X^2$, $X^3$, $R^1$, $R^2$ and B refer to formula (6), is reacted with one equivalent of the acylating agent in column III. The shade on cotton is bright reddish blue.

EXAMPLES 375–390

In place of the 5-cyano-2,4,6-trichloropyrimidine used in Examples 253–268 there may be used an equivalent amount of 2,4-dichloro-5-nitropyrimidine.

EXAMPLES 391–406

In place of the 5-cyano-2,4,6-trichloropyrimidine used in Examples 253–268 there may be used an equivalent amount of 5-ethoxycarbonyl-2,4-dichloropyrimidine.

EXAMPLES 407–422

In place of the 5-cyano-2,4,6-trichloropyrimidine used in Examples 253–268 there may be used an equivalent amount of 2,4-dichloropyrimidine-5-carbonyl chloride.

EXAMPLES 423–438

In place of the 5-cyano-2,4,6-trichloropyrimidine

TABLE II

| I Example | $X^1$ | $X^2$ | $X^3$ | $X^4$ | $R^1$ | $R^2$ | B | III |
|---|---|---|---|---|---|---|---|---|
| 254 | H | $SO_3H$ | H | H | $C_2H_5$ | m-sulpho benzyl | H | 5-cyano-2,4,6-trichloropyrimidine |
| 255 | $CH_3$ | '' | '' | '' | '' | '' | '' | '' |
| 256 | $C_2H_5$ | '' | '' | '' | '' | '' | '' | '' |
| 257 | $OCH_3$ | '' | '' | '' | '' | '' | '' | '' |
| 258 | Cl | '' | '' | '' | '' | '' | '' | '' |
| 259 | $SO_3H$ | H | '' | '' | $CH_3$ | '' | '' | '' |
| 260 | $CO_2H$ | '' | '' | '' | '' | '' | '' | '' |
| 261 | H | $CO_2H$ | '' | '' | $CH_2CH_2OH$ | '' | '' | '' |
| 262 | '' | H | $SO_3H$ | '' | $C_3H_7$ | '' | '' | '' |
| 263 | $CH_3$ | '' | '' | '' | $CH_3$ | $CH_3$ | $OCH_3$ | '' |
| 264 | $SO_3H$ | $OCH_3$ | H | '' | $CH_2CH_2CN$ | $CH_2CH_2CN$ | $OC_2H_5$ | '' |
| 265 | '' | $CH_3$ | '' | '' | $CH_2CH_2OH$ | $CH_2CH_2OH$ | $CH_3$ | '' |
| 266 | H | H | '' | '' | m-sulpho benzyl | m-sulpho benzyl | H | '' |
| 267 | '' | '' | $CH_3$ | $SO_3H$ | $C_2H_5$ | '' | '' | '' |
| 268 | $SO_3H$ | '' | '' | H | '' | '' | '' | '' |

EXAMPLES 269–284

In place of the 5-cyano-2,4,6-trichloropyrimidine used in Examples 253–268 there may be used an equivalent amount of 2,4,6-trichloropyrimidine.

EXAMPLES 285–310

In place of the 5-cyano-2,4,6-trichloropyrimidine used in Examples 253–268 there may be used an equivalent amount of 2,4,5,6-tetrachloropyrimidine.

EXAMPLES 311–326

In place of the 5-cyano-2,4,6-trichloropyrimidine used in Examples 253–268 there may be used an equivalent amount of 2,4,6-tribromopyrimidine.

EXAMPLES 327–342

In place of the 5-cyano-2,4,6-trichloropyrimidine used in Examples 253–268 there may be used an equivalent amount of 5-methyl-2,4,6-trichloropyrimidine.

EXAMPLES 343–358

In place of the 5-cyano-2,4,6-trichloropyrimidine used in Examples 253–268 there may be used an equivalent aount of 5-nitro-2,4,6-trichloropyrimidine.

EXAMPLES 359–374

In place of the 5-cyano-2,4,6-trichloropyrimidine used in Examples 253–268 there may be used an equivalent amount of 2,4-dichloro-5-nitro-6-methylpyrimidine.

used in Examples 253–268 there may be used an equivalent amount of 2,4,6-trifluoro-5-chloropyrimidine.

EXAMPLES 439–454

In place of the 5-cyano-2,4,6-trichloropyrimidine used in Examples 253–268 there may be used an equivalent amount of 4,5-dichloro-2-methylsulphonyl-6-methyl pyrimidine.

EXAMPLES 455–470

In place of the 5-cyano-2,4,6-trichloropyrimidine used in Examples 253–268 there may be used an equivalent amount of 2,3-dichloroquinoxaline-5carbonyl chloride.

EXAMPLES 471–486

In place of the 5-cyano-2,4,6-trichloropyrimidine used in Examples 253–268 there may be used an equivalent amount of 2,3-dichloroquinoxaline-6-carbonyl chloride.

EXAMPLES 487–502

In place of the 5-cyano-2,4,6-trichloropyrimidine used in Examples 253–268 there may be used an equivalent amount of 2,3-dichloroquinoxaline-5-sulphonyl chloride.

EXAMPLES 503–518

In place of the 5-cyano-2,4,6-trichloropyrimidine used in Examples 253–268 there may be used an equivalent amount of 2,3-dichloroquinoxaline-6-sulphonyl chloride.

EXAMPLES 519–534

In place of the 5-cyano-2,4,6-trichloropyrimidine used in Examples 253–268 there may be used an equivalent amount of 2,4-dichloroquinazoline-6-sulphonyl chloride.

EXAMPLES 535–550

In place of the 5-cyano-2,4,6-trichloropyrimidine used in Examples 253–268 there may be used an equivalent amount of 2,4-dichloroquinazoline-7-sulphonyl chloride.

EXAMPLES 551–566

In place of the 5-cyano-2,4,6-trichloropyrimidine used in Examples 253–268 there may be used an equivalent amount of 2,4,6-trichloroquinazoline-7-sulphonyl chloride.

EXAMPLES 568–582

In place of the 5-cyano-2,4,6-trichloropyrimidine used in Examples 253–268 there may be used an equivalent amount of 2,4,6-trichloroquinazoline-8-sulphonyl chloride.

Examples 583–598

In place of the 5-cyano-2,4,6-trichloropyrimidine used in Examples 253–268 there may be used an equivalent amount of 2,4,7-trichloroquinazoline-6-sulphonyl chloride.

EXAMPLES 599–614

In place of the 5-cyano-2,4,6-trichloropyrimidine used in Examples 253–268 there may be used an equivalent amount of 2,4,8-trichloroquinozaoline-6-sulphonyl chloride.

EXAMPLES 615–630

In place of the 5-cyano-2,4,6-trichloropyrimidine used in Examples 253–268 there may be used an equivalent amount of 2,4-dichloroquinazoline-6-carbonyl chloride.

EXAMPLES 631–646

In place of the 5-cyano-2,4,6-trichloropyrimidine used in Examples 253–268 there may be used an equivalent amount of 1,4-dichlorophthalazine-6-carbonyl chloride.

EXAMPLES 647–662

In place of the 5-cyano-2,4,6-trichloropyrimidine used in Examples 253–268 there may be used an equivalent amount of $\beta$-(4,5-dichloropyridazon-1-)propionyl chloride.

EXAMPLES 663–678

In place of the 5-cyano-2,4,6-trichloropyrimidine used in Examples 253–268 there may be used an equivalent amount of 1-(4'-chlorocarbonylphenyl)-4,5-dichloro-6-pyridazone

EXAMPLES 679–694

In place of the 5-cyano-2,4,6-trichloropyrimdine used in Examples 253–268 there may be used an equivalent amount of 1-(4'-chlorosulphonylphenyl)-4,5-dichloro-6-pyridazone

EXAMPLES 695–710

In place of the 5-cyano-2,4,6-trichloropyrimidine used in Examples 253–268 there may be used an equivalent amount of 3,6-dichloropyridazine-4-carbonyl chloride.

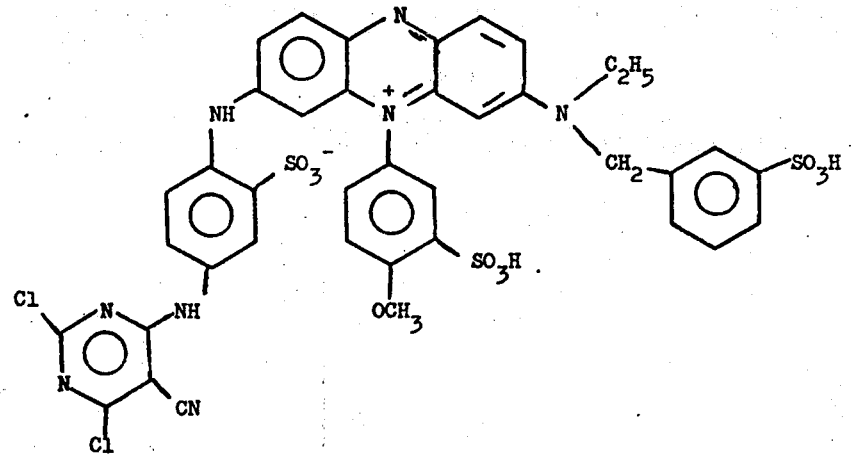

We claim:
1. A dyestuff of the formula

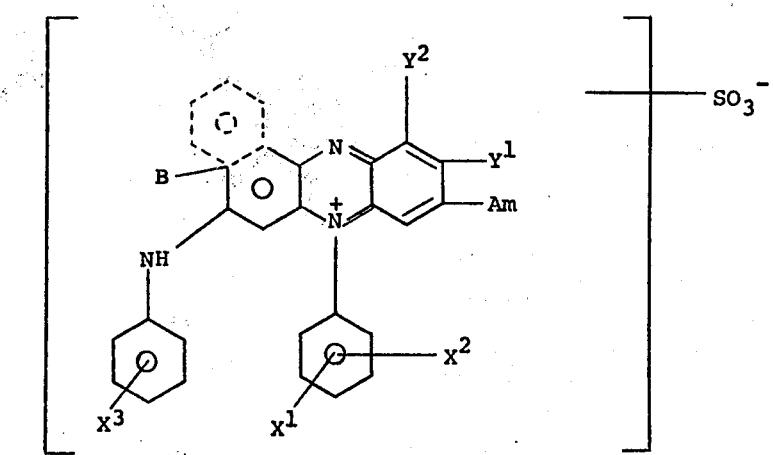

wherein Am represents an anilino, di($C_{1-4}$ alkyl) amino, di(hydroxyethyl) amino, di(cyanoethyl)amino or N($C_{1-4}$ alkyl) benzylamino group; one of $Y^1$ and $Y^2$ is H or $SO_3H$ and the other is H or an alkyl or alkoxy group of 1–4 carbon atoms; one of $X^1$ or $X^2$ is H or $SO_3H$ and the other is H, an alkyl group of 1–4 carbon atoms, an alkoxy group of 1–4 carbon atoms, Cl or $CO_2H$; $X^3$ is H, an alkyl group of 1–4 carbon atoms or $SO_3H$; when the dotted fused ring is present B is absent and when the dotted fused ring is absent B is H, an alkyl group of 1–4 carbon atoms or an alkoxy group of 1–4 carbon atoms; a NHQ group being present on the benzene nucleus bearing $X^3$ or on a benzene nucleus in the group Am when that group contains a benzene nucleus or two NHQ groups are present, one at each of the two said locations, wherein Q is a cellulose reactive group of the diazine series selected from the group consisting of 3:6-dichloropyridazine-4-carbonyl,
2:3-dichloro-quinoxaline-5- and -6-carbonyl,
2:3-dichloroquinoxaline-5- and -6-sulphonyl,
2:4:6-trichloro-quinazoline-7- and -8-sulphonyl,
2:4:7- and 2:4:8-trichloro-quinazoline-6-sulphonyl,
2:4-dichloro-quinazoline-6-carbonyl,
1:4-dichloro-phthalazine-6-carbonyl,
β-(4:5-dichloro-pyridazonyl-10)propionyl,
2:4-dichloroquinazoline-6- and 7-sulphonyl,
4-(4':5'-dichloro-pyridaz-6'-on-1'-yl)benzoyl,
1-(4':5'-dichloro-pyridaz-6'-on-1'-yl)phenylsulphonyl,
2:4-dichloro-pyrimidin-6-yl,
2:4-dibromo-pyrimidin-6-yl,
4:6-dichloro-pyrimidin-2-yl,
4:6-dibromo-pyrimidin-2-yl,
2:4:5-trichloropyrimidin-6-yl,
4:5:6-trichloropyrimidin-2-yl,
5-methyl-2:4-dichloropyrimidin-6-yl,
5-methyl-4:6-dichloropyrimidin-2-yl,
5-nitro-2:4-dichloropyrimidin-6-yl,
5-nitro-4:6-dichloropyrimidin-2-yl,
2-chloro-5-nitro-6-methyl-pyrimidin-4-yl,
4-chloro-5-nitro-6-methyl-pyrimidin-2-yl,
2-chloro-5-nitropyrimidin-4-yl,
4-chloro-5-nitropyrimidin-2-yl,
2:4-dichloro-5-cyanopyrimidin-6-yl,
4:6-dichloro-5-cyanopyrimidin-2-yl,
5-ethoxycarbonyl-2-chloro-pyrimidin-4-yl,
5-ethoxycarbonyl-4-chloro-pyrimidin-2-yl,
2:4-dichloropyrimidine-5-carbonyl,
5-dichloro-2-methylsulphonyl-6-methylpyrimidin-4-yl,
2,4-difluoro-5-chloropyrimidin-6-yl and
4,6-difluoro-5-chloropyrimidin-2-yl and the dyestuff as a whole contains 2 to 5 sulphonic acid groups.

2. The dyestuff of claim 1 which contains 2–3 sulphonic acid groups.

3. A dyestuff as claimed in claim 1 wherein Q is or contains a pyrimidinyl group having at least one chlorine or bromine atom attached to a carbon atom of the pyrimidine ring.

4. A dyestuff as claimed in claim 3 of the formula: